(No Model.)

C. H. DOUGLAS.
SAW.

No. 542,630. Patented July 16, 1895.

Witnesses
J. H. Reynolds
C. R. Parsons

Inventor
Charles H. Douglas

UNITED STATES PATENT OFFICE.

CHARLES H. DOUGLAS, OF CHICAGO, ILLINOIS.

SAW.

SPECIFICATION forming part of Letters Patent No. 542,630, dated July 16, 1895.

Application filed November 23, 1894. Serial No. 529,718. (No model.)

*To all whom it may concern:*

Be it known that I, CHARLES H. DOUGLAS, a citizen of the United States, residing at Chicago, in the county of Cook and State of Illinois, have invented certain new and useful Improvements in Saws; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in the teeth of saws, and the object is to provide a saw that will cut easily and accurately through timber of every quality and kind without scoring or roughening the walls of the kerf and without consuming as much power to do a given amount of work as other saws require. I attain this object by the form and construction of saw-teeth herein described, and illustrated in the accompanying drawings.

Figure 1:
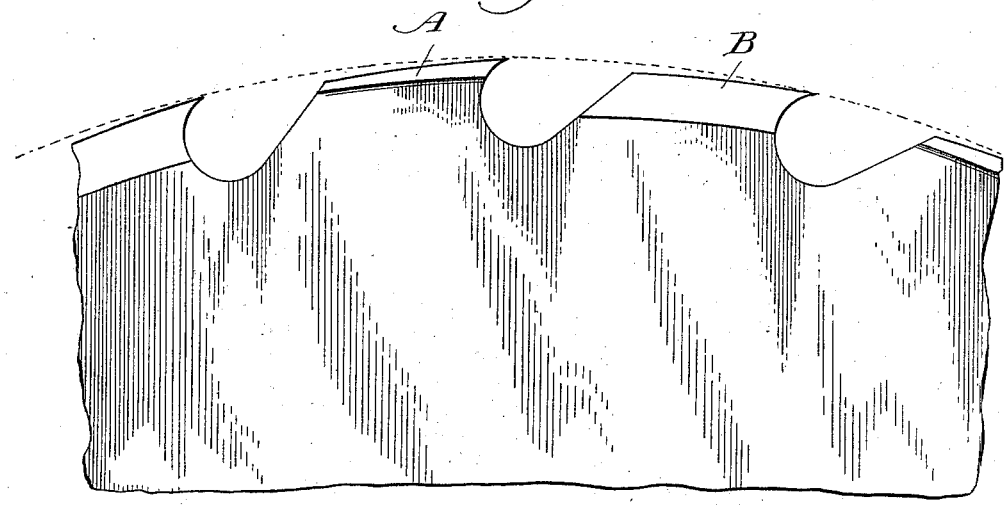
Figure 2:
Figure 3:
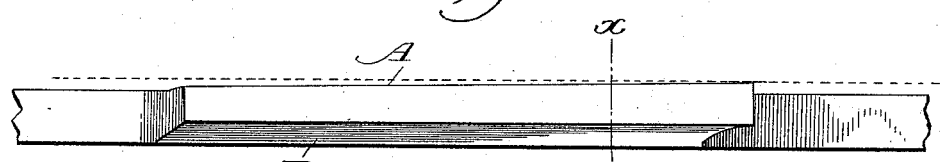
Figure 4:
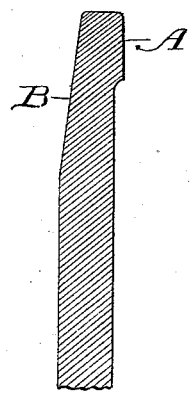

Figure 1 is a small portion of a circular saw, showing a few of the improved teeth. Fig. 2 is an edge view of the same. Fig. 3 is an enlarged view of one tooth. Fig. 4 is a cross-section through line $x$ $x$, Fig. 3.

Similar letters refer to similar parts throughout the several views.

The teeth are so formed that there is a clearance on the back or outer edge of each tooth of less than five degrees from the point or cutting edge to the heel, which causes them to cut or produce shavings instead of breaking the chip into sawdust. On one side of each tooth there is a flat rib A, which extends from the cutting-point to the heel, and on the opposite side of each is a bevel B. These ribs are on alternate sides of the teeth and project about one one-hundreth of an inch, more or less, according to the size or thickness of the blade. The object of the ribs is to widen the cutting-points of the teeth and also to present a flat surface against the walls of the kerf as a steadier of the saw while cutting.

The form of the teeth is such that the front or cutting end of each tooth is more easily sprung sidewise than the heel, and therefore if the rib was made as prominent at the heel as at the point of each tooth the point would spring away from the wall of the kerf and leave all the pressure against the heel. To overcome this result and fully compensate for the unequal side spring at the two ends of the tooth, the rib A is made tapering from the point to the heel or more prominent at the point than at the heel of each tooth, as shown in Figs. 2 and 3. By this device the rib A is caused to ride against the wall of the kerf with about equal pressure at both ends, and the friction that would otherwise ensue from an unequal pressure upon the face of the rib is thus avoided.

The angle required to cause rib A to come level with the wall of the kerf and in exact line with the cut when in actual work does not exceed one degree, and in most kinds of timber should be much less to avoid cutting or scoring the timber.

In my former patent on saws, No. 431,510, I have described a rib on the side of the tooth that is level with the face of the saw, or as prominent at one end as the other. The taper form of rib herein described is a great improvement over the former rib, as it causes the saw to cut more easily and run cooler, while it accomplishes just as smooth work.

I do not limit my invention to any special form of saws. It is equally useful on band, straight, or circular saws, either solid or inserted teeth.

Having described my invention, what I claim is—

1. A saw provided with teeth so formed that the backs or outer edges of the teeth have a clearance of less than five degrees angle from the line of cut, and on the sides of which there are ribs A, A, which extend from the cutting points to or toward the heels, which ribs are more prominent at the points than at the heels of the teeth, and form an angle with the face of the saw blade of less than one degree, substantially as and for the purpose herein specified.

2. A saw-tooth that is provided with a rib A on one side, from the point of said tooth to or toward the heel, which rib is thicker or more prominent at the point than at the heel, substantially as and for the purpose specified.

In testimony whereof I affix my signature in presence of two witnesses.

CHARLES H. DOUGLAS.

Witnesses:
J. E. SMITHERS,
GOFF A. HALL.